United States Patent
Bischoff

[19]

[11] Patent Number: 6,155,049

[45] Date of Patent: Dec. 5, 2000

[54] METHOD OF CONTROLLING THE CHARGE AIR MASS FLOW OF A SUPERCHARGED INTERNAL COMBUSTION ENGINE

[75] Inventor: Roland Bischoff, Plüderhausen, Germany

[73] Assignee: DaimlerChrysler AG, Stuttgart, Germany

[21] Appl. No.: 09/260,275

[22] Filed: Mar. 20, 1999

[30] Foreign Application Priority Data

Mar. 3, 1998 [DE] Germany ............................ 198 08 832

[51] Int. Cl.$^7$ .................................................. F02D 23/00
[52] U.S. Cl. ............................................. 60/602; 60/605.2
[58] Field of Search ..................... 60/602, 605.2

[56] References Cited

U.S. PATENT DOCUMENTS

| | | | |
|---|---|---|---|
| 5,083,434 | 1/1992 | Dahlgren et al. | 60/602 |
| 5,551,235 | 9/1996 | Entenmann et al. | 60/602 |

FOREIGN PATENT DOCUMENTS

| | | |
|---|---|---|
| 43 12 077 | 1/1994 | Germany . |
| 689 17 106 | 7/1994 | Germany . |
| 195 31 871 | 11/1996 | Germany . |
| 195 31 871 C1 | 11/1996 | Germany . |
| WO 97/45633 | 12/1997 | WIPO ...................................... 60/602 |

*Primary Examiner*—Noah P. Kamen
*Attorney, Agent, or Firm*—Klaus J. Bach

[57] ABSTRACT

In a method of controlling the charge air mass flow of an internal combustion engine having an exhaust gas turbocharger with adjustable turbine geometry and a control unit for controlling the operation of the turbocharger, the intake air and exhaust gas pressures are determined and a corresponding differential pressure value is generated which is compared with a desired differential pressure value for generating a control signal on the basis of which the turbine geometry is adjusted and, during instationary engine operation when an increased engine load is required, the turbine geometry adjustment is modified so as to reduce the turbine inlet flow cross-section to thereby increase the engine charge air pressure.

16 Claims, 2 Drawing Sheets

METHOD OF CONTROLLING THE CHARGE AIR MASS FLOW OF A SUPERCHARGED INTERNAL COMBUSTION ENGINE

BACKGROUND OF THE INVENTION

The invention relates to a method of controlling the charge air mass flow of an internal combustion engine, which is supercharged by an exhaust gas turbocharger having adjustable vanes. A control unit compares the actual control value with a desired control value and provides control signals to a vane adjusting mechanism for adapting the actual value to desired value.

As is well known, an exhaust gas turbocharger includes a gas turbine driven by the exhaust gas flow of an internal combustion engine and a compressor, which is driven by the turbine and which compresses a fresh air flow for the internal combustion engine depending on its speed. The turbine and the compressor are disposed on a single shaft so that they are rigidly interconnected. As a result, the charge air pressure generated by the compressor and the exhaust gas pressure upstream of the turbine are intertwined because of the torque equilibrium at the charger shaft. Because of the charge air pressure effective at the exhaust side of the compressor, the exhaust gas stream upstream of the turbine is backed up. The pressure head of the exhaust gas flow is converted by the turbocharger to charge air pressure in accordance with a particular pressure transmission ratio which is effective between the turbine and the compressor and which is determined by the respective flow cross-sections. When the charge air pressure is increased, also the charge air mass flow, that is, the charge air flow through the internal combustion engine increases so that its power output is increased.

It is well known that the inlet flow cross-section of the turbine can be changed by an adjustable turbine geometry, for example by adjustable inlet vanes. In this way, the energy of the pressure head, which is to be transmitted by the exhaust gas turbocharger to the charge air flow can be changed. The turbine geometry can assume any position between a fully open position with maximum inflow cross-section and a fully closed position with minimum inflow cross-section and the vane position is infinitely variable between the fully open and fully closed positions. In a stationary operating state of the internal combustion engine, by controlling the turbine geometry the inlet flow cross-section of the turbine is controlled so as to provide the desired charge air flow to the engine. With increasing power, the inflow cross-section of the turbine is reduced and the resulting backup air pressure head of the exhaust gas increases the compressor output. In this way, the charge air mass flow is adapted to the respective operating conditions. During instationary operation of the internal combustion engine, for example during a load increase step, the turbine geometry is changed so as to reduce the inlet flow cross-section to increase the charge air pressure. A load increase step is the incremental load increase between two stationary operating conditions.

The adjustable turbine geometry is the control structure of a control unit for controlling the charge air mass flow. The control unit performs a comparison between an actual and a desired value of the control structure with a control value provided as a guide value. Depending on the actual/desired value comparison of the control value, the control unit generates control signals for a controller for adjusting the turbine geometry in order to adapt the actual value to the control value.

Such a method is already known from DE 195 31 871 C1 for controlling the charge air pressure, wherein a control difference of the charge air pressure, that is the difference between the given desired value and the determined actual value is supplied to the control unit. If the determined actual value of the charge air pressure deviates from the given desired value, the control unit changes the control setting of the adjustable geometry of the turbocharger inlet vanes to cause an adaptation of the actual value to the desired value. The desired value for the charge air pressure to be provided is selected from a particular performance graph and a respective value is taken therefrom depending on the measurement data of the control deviation as a function of the engine speed and the fuel injection amount. When the inlet flow cross-section to the turbine is increased in order to speed up the turbocharger and to increase the charge air pressure, the back pressure of the exhaust gas at the outlet of the internal combustion engine is of course also increased. This increases the exhaust work that is the gas change work of the piston, which decreases the efficiency of the internal combustion engine. It is therefore necessary that the exhaust gas back pressure is monitored and an excess pressure is counteracted so that the engine torque increases in an optimal manner.

The known method proposed therefore to supply to the control unit an additional input value, which is determined as a function of the exhaust gas pressure. This additional value represents the difference between an operating point-dependent maximally admissible differential pressure and the actual differential pressure, the differential pressure being calculated as the difference between the exhaust gas pressure and the charge air pressure. This difference can assume values, which are negative, about zero or positive. If, for example, as control value a differential is determined, which is much smaller than zero, the exhaust gas pressure is too high for an optimal torque buildup. Then the control algorithm of the charge air pressure is modified in such a way that the vane opening of the exhaust gas turbocharger is corrected toward greater opening. The control unit can access for this process a differential pressure performance graph from which it can take the maximally admissible differential pressure for a possible correction of the vane position of the turbine geometry.

In order to provide a suitable control algorithm and to be able to handle, in addition to the control deviation, the difference between the charge air pressure and the exhaust gas pressure, the known method needs an additional fuzzy-control unit.

The adjustment of the control process to various operating conditions of the internal combustion engine over the whole engine performance range and particularly during stationary operation requires numerous and complex tests for the establishment of a nominal charge air pressure performance graph for determining the control deviation of the charge air pressure. Particularly for load control (engine speed=constant) and for acceleration procedures (load and engine speed not constant), the known control method on the basis of the charge air pressure, the charge air performance graph and the controller adjustment must be established in a time consuming manner on an engine test bed by a highly experienced application expert.

It is the object of the present invention to provide a method of controlling the charge air mass flow which, with little application efforts, provides for an optimal operation behavior of the internal combustion engine under any operating condition.

SUMMARY OF THE INVENTION

In a method of controlling the charge air mass flow of an internal combustion engine having an exhaust gas turbocharger with adjustable turbine geometry and a control unit for controlling the operation of the turbocharger, the intake air and exhaust gas pressures are determined and a corresponding differential pressure value is generated which is compared with a desired differential pressure value for generating a control signal on the basis of which the turbine geometry is adjusted. During instationary engine operation when an increased engine load is required, the turbine geometry adjustment is modified so as to reduce the turbine inlet flow cross-section to thereby increase the charge air pressure.

By controlling the charge air mass flow in accordance with the invention using a control valve, the difference between the charge air pressure and the exhaust gas pressure effective on the turbine a single nominal value of the pressure difference can be used as a guide value basically over the whole performance graph of the engine for controlling the engine. There is no need for a complex determination of optimal nominal values for the various operating points of the internal combustion engine. Such values would have to be selected by the control unit depending on certain criteria and would have to be processed in a complicated control algorithm to determine control signals for the adjustment of the turbine geometry. With the control procedure according to the invention, wherein the charge air mass flow is controlled directly on the basis of the pressure difference, on optimal control is obtained especially during instationary engine operation without the use of substitution control values. Rather, a directly measurable physical control value determines the control process since a directly measurable physical control value determines the control process, that is the inlet flow cross-section for the turbine.

From the deviation of the actual value from the nominal value of the pressure difference, if the there is one, the control unit determines directly a control signal for the operating mechanism which changes the turbine geometry (inlet vane position) so as to correct the actual value. The control of the charge air mass flow using the pressure differential as a control value is independent of the type of exhaust gas turbocharger that is the turbine with adjustable turbine geometry and the size of the control members. This further reduces application expenses when compared with methods presently in use. Since, with the method according to the invention, the control operation is purely motor-dependent, the control system can accommodate also deteriorations of the control effectiveness of the turbine geometry, for example, by wear. The system will adjust the turbine geometry simply to achieve a certain pressure difference between charge air and exhaust gas pressure. Even after an extended period of operation and with increased play in the turbine vane adjustment mechanism, the outer control mechanism and the charger, a new operating behavior of the exhaust gas charger can be achieved even during instationary operation and the internal combustion engine can be operated with optimal efficiency.

It is advantageous if, during instationary operation when the load is increased, a certain desired value of the pressure difference is provided as a guide value. This guide value is optimized so as to obtain a fast acceleration of the exhaust gas turbocharger while maintaining the highest possible efficiency of the internal combustion engine.

It is particularly advantageous if a special desired value for the pressure difference is provided for the various operating conditions of the engine for the control of the turbocharger. In this case, it may be advantageous during stationary operation to provide an optimized desired value of the pressure differential for the control of the air mass flow in order to achieve low fuel consumption of the engine. During stationary operation the internal combustion engine can therefore be operated with only one pressure differential value as desired value over the whole performance graph with optimal fuel consumption. During the setting of the desired value, any compromise can be made between optimal fuel consumption and optimal emissions. For example, $NO_x$ emissions can be reduced with an increased pressure differential that is with a greater exhaust gas back up pressure or with a lower charge air pressure.

It is also advantageous if the variable geometry is utilized for braking the internal combustion engine. In this case, the flow cross-section to the turbine is reduced so that, by generating an excessive exhaust gas back pressure, the efficiency of the engine is reduced because the work to be performed by the pistons for the discharge of the exhaust gases from the cylinders is increased. During engine braking operation, a predetermined desired value for the pressure difference is supplied to the control unit as the control value. The motor braking operation and the brake force can be varied and adjusted to the desired value by steplessly changing the desired value for the pressure difference. For the stepless engine braking operation, desired values of the pressure differential are electronically stored in a braking performance graph—based on different brake forces—and are supplied to the control unit as needed.

The method according to the invention can also be used advantageously during exhaust gas recirculation operation of the internal combustion engine wherein a controlled exhaust gas partial flow is returned to the intake duct of the engine. Exhaust gas recirculation is difficult or impossible with charged internal combustion engines, since the pressure difference needed for returning the exhaust gas to the intake duct is often insufficient or even negative. This is because the charge air pressure generated by the compressor is so high that the exhaust gases cannot normally flow back to the intake duct. However, by reducing the inlet flow cross-section of the turbine, the exhaust gas back pressure can be increased so that an exhaust gas recirculation flow can be achieved and this exhaust gas recirculation flow can be controlled by the adjustment of the turbine geometry. In accordance with the invention, the charge air mass flow is controlled during exhaust gas recirculation by providing a predetermined desired value for the pressure difference for this operating condition whereby an appropriate exhaust gas recirculation flow can be established. Preferably, desired values for the pressure difference depending on different exhaust gas recirculation rates are recorded in an exhaust gas recirculation performance graph. If exhaust gas recirculation operation with a particular exhaust gas recirculation rate is desired, the control unit takes the respective desired value for the pressure difference which results in the desired exhaust gas recirculation rate from the performance graph and uses that value as control value for the adjustment of the pressure difference of the air mass flow.

Other features of the invention will become apparent from the following description of a method of controlling the charge air mass flow of a turbocharged internal combustion engine on the basis of the accompanying drawings:

DESCRIPTION OF PREFERRED EMBODIMENT

Figure 1:
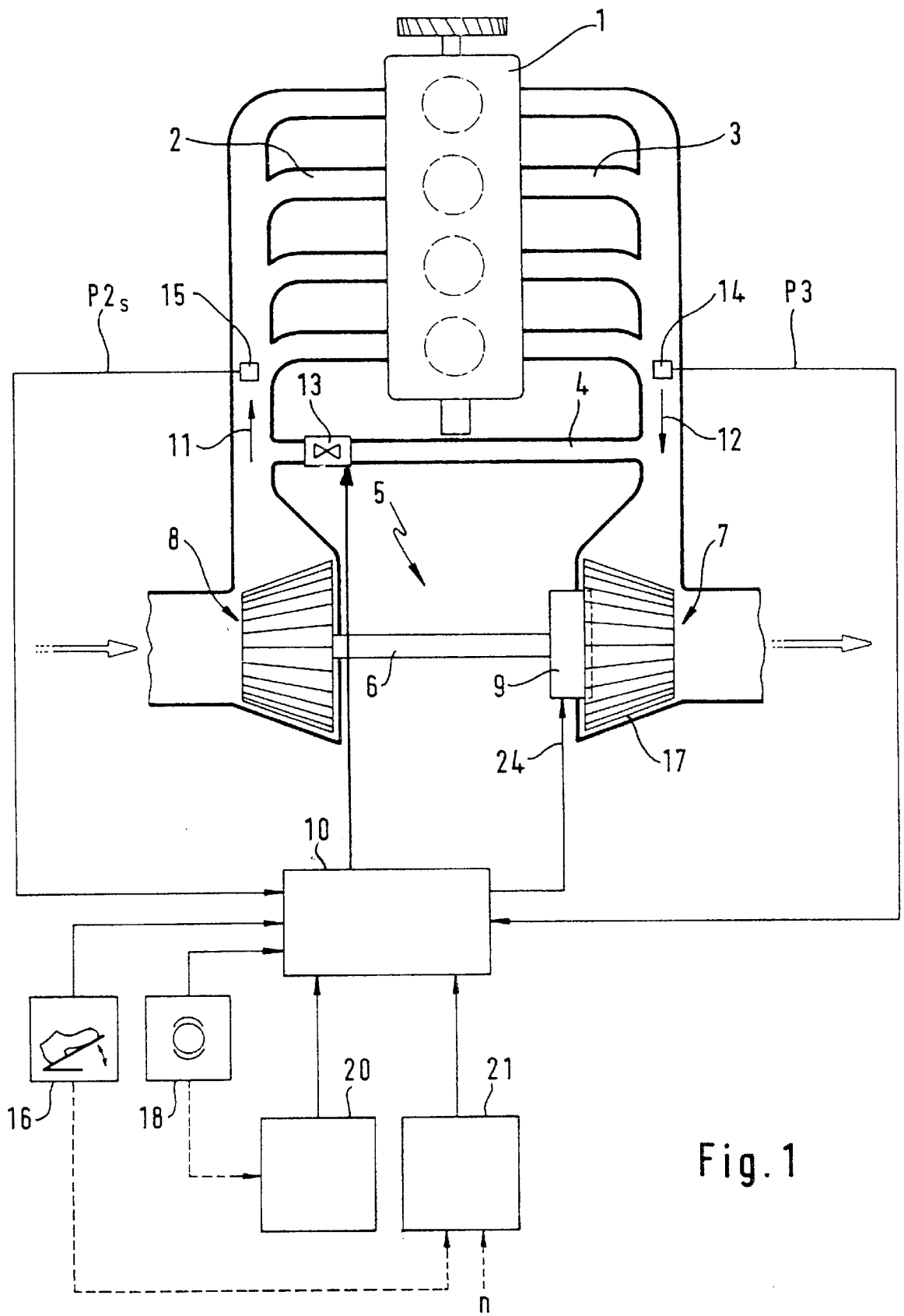
FIG. 1 shows schematically a turbocharged internal combustion engine for performing the method.

FIG. 1 shows an internal combustion engine 1, which is charged by an exhaust gas turbocharger 5. The exhaust gas turbocharger 5 comprises an exhaust duct 3 including a turbine 7 and an intake duct 2 including a compressor 8. The compressor 8 is driven by the turbine 7 and supplies a compressed air mass flow 11 to the internal combustion engine 1. The turbine 7 and the compressor 8 are rigidly interconnected by a charger shaft 6 so that they rotate synchronously. The kinetic energy of the exhaust gas flow discharged from the internal combustion engine is transferred by the compressor to the fresh air flow in the intake duct in dependence on the flow behavior through the two fluid machines, that is, dependent on the ratio of the respective inlet flow cross-sections of the turbine 7 and the compressor 8.

The turbine 7 includes an adjustable turbine geometry (adjustable vanes) so that its flow admission behavior can be changed by changing the effective exhaust gas inlet flow cross-section of the turbine. A control mechanism operates an adjustable flow guide structure 17 of the turbine 7, for example, adjustable vanes. The flow guide structure 17 controls the inlet flow cross-section to the turbine 7 so that, with the rigid inlet flow cross-section of the compressor 8, a certain pressure transmission ratio depending on the operating condition of the internal combustion engine is provided for generating the desired charge air mass flow 11. Each stationary operating state of the internal combustion engine 1 has a certain turbine inflow cross-section assigned to it, which decreases with increasing load. An increasing backup pressure of the exhaust gas flow ahead of the turbine 7 causes the speed of the exhaust gas turbocharger 5 to increase providing for an increased compressor output and an increased charge air mass flow.

For the control of the charge air mass flow, a control unit 10 is provided, which generates a control signal 24 for operating a drive mechanism 9 of the turbine flow guide structure 17 for the adjustment of the inflow cross-section of the turbine. To generate the control signal 24, the signal value of a pressure sensor 15 is supplied to the control unit 10. The pressure sensor 15 is disposed in the intake duct of the internal combustion engine downstream of the compressor 8 and downstream of a charge air cooler, which is not shown, so as to sense the charger air pressure $P2s$. Furthermore, the control unit 10 receives the pressure signal of a pressure sensor 14 arranged in the exhaust duct 3 which senses the exhaust gas pressure $P3$ ahead of the turbine 7 of the exhaust gas turbocharger 5. With the measuring signals provided by the pressure sensors 14 and 15, the control unit 10 determines the pressure difference between the charge air pressure in the intake duct and the exhaust gas pressure in the exhaust duct. The measured charge air pressure $P2s$ and the exhaust gas pressure $P3$ are compared and the pressure difference $P2s-P3$ is used as a control value for the charge air mass flow 11. However, the pressure difference may also be generated directly by a differential pressure sensor.

A control unit 10 includes in its memory a predetermined desired value for the differential pressure $P2s-P3$ as a guide value. The control unit 10 executes an actual/desired value comparison of the pressure differential and determines the required correction of the turbine geometry if the comparison indicates a need for such an action. If the actual value of the pressure differential deviates from the desired value, a corresponding control signal 24 for the vane drive mechanism 9 of the turbine guide vanes 17 is generated, without the involvement of any additional values, for adjusting the turbine geometry so as to generate the desired pressure differential. With the pressure differential $P2s-P3$ as a control value, the optimal turbine inlet flow cross-section for the turbine is directly determined without the need for calculating a control value by the involvement of complicated algorithms.

During instationary operation of the internal combustion engine, for example with a certain load increase, a certain desired value of the pressure differential $P2s-P3$ is provided in the control circuit as a guide value. The desired value for the pressure differential $P2s-P3$ is determined in advance and is optimized with a view to a rapid acceleration of the exhaust gas turbocharger 5 and the highest possible efficiency of the internal combustion engine. This acceleration-optimized desired value for the pressure differential is always available to the control unit 10 and is used in the control circuit whenever there is an instationary operating state.

During stationary operation of the internal combustion engine, the charge air mass flow 11 can be controlled with a control value based on the charge air pressure $P2s$ measured in the intake duct. In this case, a specific desired charge air pressure corresponding to the instant stationary operating state forms the guide value in the control circuit. During stationary operation of the internal combustion engine, there are generally only small control deviations of the charge air pressure. And with an almost constant exhaust gas flow 12, there are also only small exhaust gas excess pressures. The control of the charge air mass flow 11 on the basis of the charge air pressure as control value provides for satisfactory results during stationary operation. Detrimental exhaust gas back-up pressures do not generally occur during this type of operation, so that, during the control on the basis of the charge air pressure, the exhaust gas pressure which is difficult to control can be disregarded to a large extent. The combined charge air pressure/pressure differential control procedure for the stationary/instationary operation of the internal combustion engine 1 facilitates an optimal operation of the internal combustion engine with a view to engine processes with small application requirements for the control procedure.

It is advantageous if the method according to the invention using the pressure differential $P2s-P3$ as a control value is employed also during stationary operation of the internal combustion engine 1. In this case, a desired value of the pressure differential $P2s-P3$, which is predetermined for this operation mode, is used as a guide value. The optimal pressure differential for the stationary operation is different from that for instationary operation. It is preferably optimized in advance with respect to a low fuel consumption of the internal combustion engine 1. With only a single applicable pressure differential value as desired value, the internal combustion engine is operated on a consumption-optimized basis stationarily over the whole performance graph. It may however also be appropriate to optimize the desired value for the pressure differential with respect to the lowest possible emissions of the internal combustion engine. Basically, in this way, any desired compromise between consumption- and emission-optimized operation can be achieved by a respective deviation from the desired value for the pressure differential. An increase of the negative pressure differential with a comparatively smaller charge air pressure for example results in a reduction of the $NO_x$ emissions.

During instationary operation of the internal combustion engine, a pressure differential $P2s-P3$ of about $-1,000$ mbar will result in an optimal compromise between rapid acceleration of the turbocharger and an acceptable increase of the exhaust gas back pressure and, consequently, optimal efficiency values of the internal combustion engine. During stationary operation, a pressure differential P2s–P3 of about −150 mbar is considered to be particularly advantageous. In a consumption oriented advantageous setting of the turbine geometry, which in the respective stationary operating state of the internal combustion engine provides for a pressure differential of −150 mbar, the exhaust emissions may be reduced to a minimum by a coordination of the beginning of the fuel injection and the duration of the fuel injection.

As long as the mode of operation of the internal combustion engine (stationary/instationary operation) is maintained the charge air mass flow 11 is controlled by the control unit 10 independently of the respective load requirement always with basically the same optimal pressure differential. For determining the operational mode and the desired value for the pres- of the injection limitation period and the added time interval, the control switches back to the stationary operation with a consumption or emission-optimized pressure differential.

If the pressure differential control according to the invention is utilized, the variable turbine geometry can be employed for the braking of the engine in a particularly effective manner. During motor braking operation, a low inlet flow cross-section of the turbine 7 is provided by a corresponding adjustment of the turbine geometry such that the resulting backup pressure of the exhaust gas flow 12 generates an increased exhaust gas pressure on the pistons in the cylinders of the internal combustion engine.

With such an increased exhaust gas back pressure, the engine efficiency is reduced and the internal combustion engine 1 is slowed down. During engine braking operation therefore a predetermined desired value is provided in the control circuit as a guide value which differs from the desired value provided during stationary operation and which causes a backup of the exhaust gas flow 12 and, consequently, braking of the internal combustion engine 1. By varying the desired value for the pressure differential P2s–P3, the braking force generated during braking operation is infinitely variable so that, within a limited range, any desired braking force can be achieved. The control unit 10 has access to a braking performance graph 20 in which specific desired values of the pressure differential for different braking forces are electronically recorded and which can be retrieved by the control unit 10 as needed. A switch-over to motor braking operation is performed after the control unit 10 receives a braking signal 18, which may be initiated for example by an actuation of a brake pedal and which indicates the need for braking. The switch-over to motor braking operation and the activation of the braking performance graph 20 can be obtained for example by a coupling of the vehicle electronic control system and the engine electronic control system, which however is not explained in detail. When the braking signal 18 is no longer present, the control system switches back from motor braking operation to normal engine operation and provides to the control circuit the pressure differential signal for stationary engine operation. The method for controlling the charge air mass flow on the basis of the pressure differential P2s–P3 makes also an exhaust gas recirculation operation possible, which was difficult or impossible to realize so far with supercharged internal combustion engines. The recirculated exhaust gas flow, which is part of the exhaust gas flow 12, passes through an exhaust gas recirculation line 4 to the intake duct 2 where it is admixed to the intake air flow 11. The exhaust gas recirculation line 4 interconnects therefore the part of the exhaust gas duct 3 disposed upstream of the turbine 7 with the part of the intake duct 2 disposed downstream of the compressor 8 of the turbocharger 5. Exhaust gas recirculation is possible when the pressure differential P2s–P3 is negative, that is, when the exhaust gas pressure P3 is greater than the charge air pressure P2s so that there is a pressure drop driving exhaust gas from the exhaust gas duct toward the intake duct. The exhaust gas recirculation line 4 includes a valve 13, which is opened when exhaust gas recirculation operation is desired. The activation of the exhaust gas recirculation operation is indicated to the control unit 10 for example by the opening of the exhaust gas recirculation valve 13. Then, by control adjustments to the turbine geometry, the control unit 10 controls the pressure differential such that the desired exhaust gas recirculation rate is achieved which may be the maximum value at a particular operating point in the performance graph of the internal combustion engine. The control unit 10 has access to an exhaust gas recirculation performance graph 21 in which desired values for the pressure differences P2s–P3 assigned to the various exhaust gas recirculation rates are recorded. The desired values for the pressure differences are recorded in the performance graph dependent on the load and the speed of the internal combustion engine 1. During exhaust gas recirculation operation, the desired differential pressure values provided for this mode of operation are available to the control unit as needed for use in the control circuit. It is therefore possible to adjust the most favorable differential pressure in the respective performance graph of the internal combustion engine so as to achieve maximal exhaust gas recirculation rates with low fuel consumption.

Figure 2A:
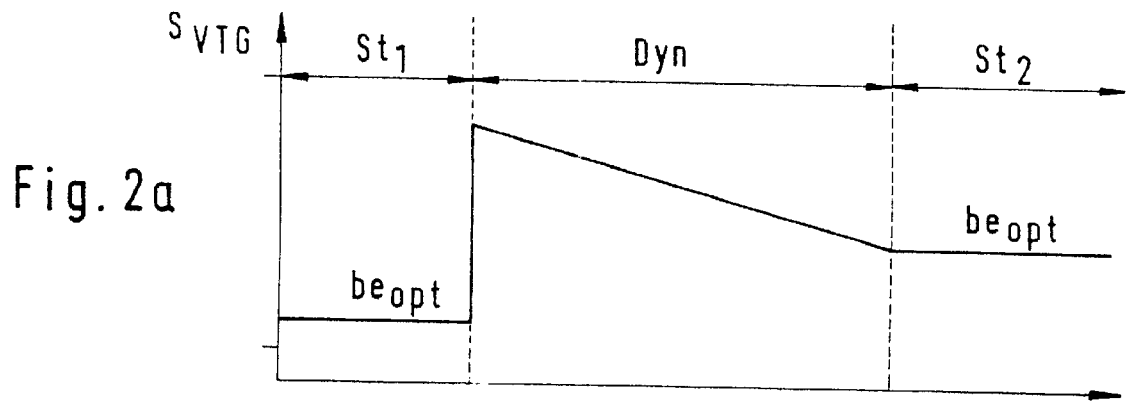
FIGS. 2a–2b are graphic representations of various time dependent operating parameters of the internal combustion engine resulting from the use of the method of controlling the charge air mass flow with the pressure difference as a control value.
Figure 2B:
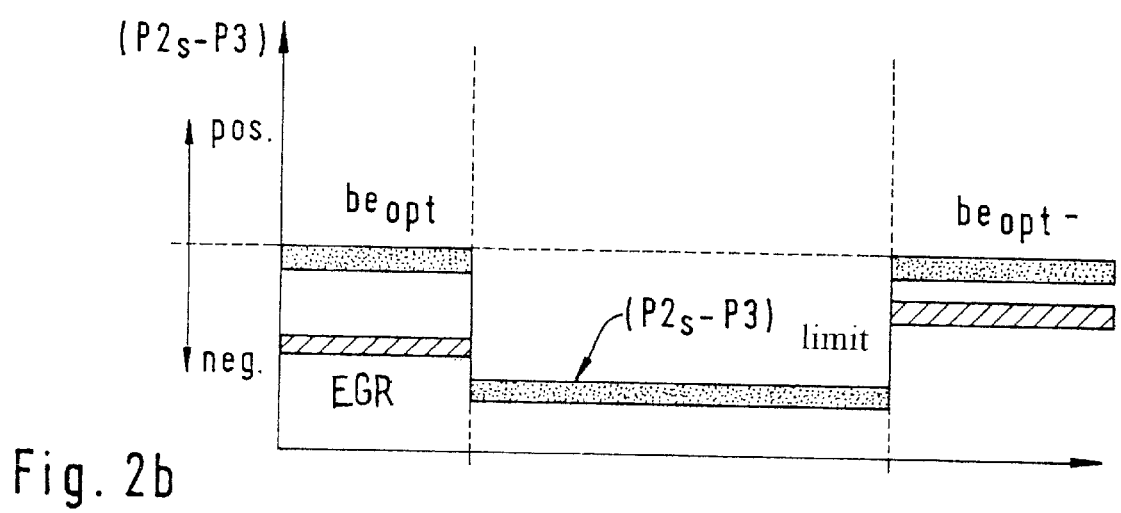

FIGS. 2a and 2b show on a time dependent basis the characteristic operating parameters of the internal combustion engine using the method according to the invention for controlling the charge air mass flow with the pressure differential P2s–P3 as control value. During the operating period represented, the load is increased by a step from a first stationary operating phase $St_1$ to a second stationary operating phase $St_2$ with an increased load. Between the stationary operating phases $St_1$, $St_2$, there is an instationary operating phase Dyn wherein the charge air pressure of the internal combustion engine is increased by reducing the inlet flow cross-section to the turbine by adjustment of the turbine geometry. FIG. 2a shows graphically the time-dependent adjustment position $S_{VTG}$ of the turbine inlet control vanes. Immediately after an increase in the load requirement, the turbine inlet vanes are closed providing only for a minimum inlet flow cross-section of the turbine. In this position, the exhaust gas pressure upstream of the turbine rapidly increases, whereby the exhaust gas turbocharger is rapidly accelerated and the charge air pressure rises rapidly. Then the turbine vanes are opened from their closed position in a controlled manner until they assume a position corresponding to the required stationary operating state $ST_2$.

The charge air mass flow is controlled during stationary as well as instationary operation using the differential pressure P2s–P3 as a control value.

During stationary operation, a pressure differential is provided which operates the internal combustion engine on an optimal consumption basis. As can be seen from FIG. 2b in which the pressure differential is plotted over time, the same, that is for example a consumption-optimized, pressure differential $be_{opt}$, is provided in the stationary phases $St_1$ and $St_2$. This pressure differential is provided for each stationary operating condition independently of the operating load which is actually present. With this single value to be provided as a guide value, the respective required charge air flow is controllable over the complete stationary performance graph of the internal combustion engine. During the instationary operating phase (Dyn), a substantially larger negative pressure differential (P2s–P3) limit which accelerates the turbocharger is provided than in the stationary operating phases $St_1$, $St_2$. The pressure differential to be obtained during the instationary operating phase is provided with a view to rapidly accelerate the exhaust gas turbocharger for a rapid increase of the charge air pressure. With this optimally adjusted pressure differential for the instationary operating phase, the exhaust gas pressure being built up ahead of the turbine is kept within the limits of a maximally admissible exhaust gas back pressure for the internal combustion engine.

As is further apparent from FIG. 2b, the pressure differential to be provided in the control circuit as a guide value in stationary phase is varied during exhaust gas recirculation operation. As already described, a certain partial exhaust gas volume which corresponds to the respective pressure differential is returned through the exhaust gas recirculation line so that, by the respective pressure differential, the desired exhaust gas recirculation rate can be obtained for each stationary operating state. An exhaust gas recirculation is especially effective in the lower partial load operating range of the internal combustion engine. With increasing load, the maximally possible exhaust gas recirculation rate is reduced. In the embodiment of a load flow with increasing operating load as shown, a lower pressure differential is provided by the control circuit for the stationary operating phase $St_2$ where the engine is under a high operating load than is provided for the first stationary operating phase $St_1$ with exhaust gas recirculation AGR. For each stationary operating state of the internal combustion engine, a particular desired pressure differential value for the maximally possible exhaust gas recirculation rate is recorded in the exhaust gas recirculation performance graph.

What is claimed is:

1. A method of controlling the charge air mass flow of a supercharged internal combustion engine having an exhaust gas turbocharger with adjustable turbine geometry (inlet vanes) and a control unit for controlling the operation of said turbocharger, said method comprising the steps of: determining an intake air pressure in an air intake duct and also an exhaust gas pressure in an exhaust gas duct of said engine, determining a pressure difference between said intake air and exhaust gas pressures as an actual differential pressure value, comparing said actual differential pressure value with a desired differential pressure value, generating a control signal directly depending on the deviation of said actual differential pressure value from said desired differential pressure value, and controlling said adjustable turbine geometry during steady state engine operation so as to reduce said deviation, and, during transient engine operation with a load increase, adjusting the turbine geometry so as to reduce the inlet flow cross-section to said turbine for increasing the charge air pressure of the internal combustion engine.

2. A method according to claim 1, wherein the charge air mass flow is controlled on the basis of the pressure difference between the intake air and the exhaust gas by providing a single desired pressure difference value over the whole steady state operating range of the internal combustion engine.

3. A method according to claim 1, wherein during transient operation of the internal combustion engine with a load increase, a predetermined desired differential pressure value is provided as a guide value for the particular transient operation.

4. A method according to claim 3, wherein the desired differential pressure value to be provided during said transient engine operation is optimized with regard to an acceleration of the exhaust gas turbocharger and efficient operation of the internal combustion engine.

5. A method according to claim 1, wherein during steady state operation of the internal combustion engine a desired value for the differential pressure which is predetermined for this type of operation is provided.

6. A method according to claim 5, wherein the desired value to be provided for steady state engine operation is optimized with respect to fuel consumption or emissions or both.

7. A method according to claim 1, wherein for engine braking operation, said adjustable geometry is controlled such that the gas inlet flow cross-section to said turbine is reduced depending on a predetermined desired value for the differential pressure.

8. A method according to claim 7, wherein the desired value for the differential pressure during engine braking operation is infinitely variable corresponding to a desired braking force.

9. A method according to claim 7, wherein desired values for the differential pressure corresponding to various braking forces are electronically recorded and are accessible to the control unit when needed.

10. A method according to claim 1, wherein for the operation of said internal combustion engine with exhaust gas recirculation, in which a controlled partial exhaust gas flow is recirculated from the engine exhaust duct to the engine intake duct, a desired value for the differential pressure is provided which results in a desired exhaust gas recirculation rate.

11. A method according to claim 10, wherein desired differential pressure values corresponding to various exhaust gas recirculation rates are deposited in an exhaust gas recirculation performance graph and are retrieved by said control unit as guide values for the adjustment of the differential pressure during exhaust gas recirculation operation of the engine.

12. A method according to claim 11, wherein the desired values for the differential pressure are predetermined and recorded in the exhaust gas recirculation performance graph depending on the load and the speed of the internal combustion engine.

13. A method according to claim 1, wherein a mode switch-over signal for switching between said steady state and said transient operation is generated based on the difference between the actual value and the desired value of the charge air pressure and a switch between said steady state and said transient operation is effected when said mode switch-over signal passes a predetermined threshold value.

14. A method according to claim 1, wherein a mode switch-over signal switching between said steady state and said transient operation is generated depending on a gradient of the load requirement formed by a time based differentiation and a switch between said steady state and said transient operation is effected when said mode switch-over signal passes a predetermined threshold value.

15. A method according to claim 1, wherein said mode switch-over signal switching between said steady state and said transient operation is generated depending on the engine speed (rpm) and a switch between said steady state and said transient operation is effected when said mode switch-over signal passes a predetermined threshold value.

16. A method according to claim 1, wherein said mode switch-over signal switching between said steady state and said transient operation is generated dependent on the ratio of the fuel mass supplied to the engine per engine cycle and the actual air mass flow and a switch between said steady state and said transient operation is effected when said mode switch-over signal passes a predetermined threshold value.

* * * * *